United States Patent
Higuchi et al.

(10) Patent No.: US 8,291,184 B2
(45) Date of Patent: Oct. 16, 2012

(54) COPY CONTROL APPARATUS

(75) Inventors: Kenji Higuchi, Kawasaki (JP); Eiichi Yamanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 213 days.

(21) Appl. No.: 12/706,334

(22) Filed: Feb. 16, 2010

(65) Prior Publication Data

US 2010/0211732 A1    Aug. 19, 2010

(30) Foreign Application Priority Data

Feb. 17, 2009   (JP) ................. 2009-034293

(51) Int. Cl.
*G06F 12/00*   (2006.01)
*G06F 12/08*   (2006.01)

(52) U.S. Cl. ........ 711/163; 711/113; 711/114; 711/162; 711/165; 711/E12.019; 711/E12.103

(58) Field of Classification Search ............... 711/163, 711/113, 114, 162, 165, E12.019, E12.103
See application file for complete search history.

(56) References Cited

U.S. PATENT DOCUMENTS 7,660,945 B1 * 2/2010 Lee et al. .............. 711/113
2009/0157768 A1 * 6/2009 Ichikawa et al. ........ 707/202

FOREIGN PATENT DOCUMENTS

JP   2003-345524   12/2003
JP   2004-102815   4/2004

* cited by examiner

*Primary Examiner* — Yong Choe
(74) *Attorney, Agent, or Firm* — Staas & Halsey LLP

(57) ABSTRACT

A copy control apparatus for controlling a copy process between disks includes a copy process execution unit, a data capacity measuring unit, and a changing unit. The copy process execution unit executes the copy process between disks by securing a storage area on a cache. The data capacity measuring unit measures a data capacity contained in a write request accepted from a host system during execution of the copy process between disks by the copy process execution unit. The changing unit changes a capacity of the storage area secured by the copy process execution unit in accordance with the data capacity measured by the data capacity measuring unit.

4 Claims, 6 Drawing Sheets

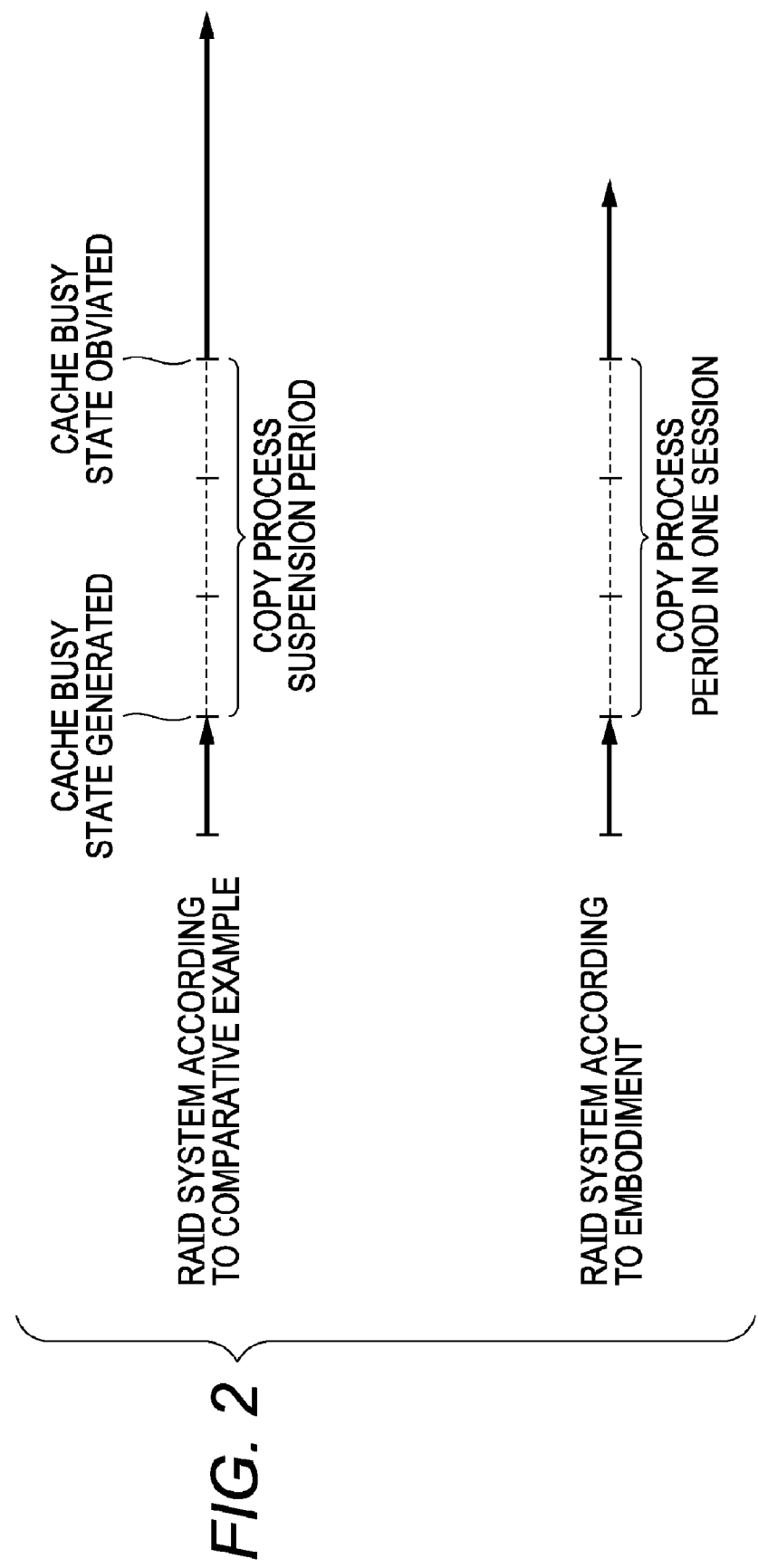

COPY CONTROL APPARATUS

CROSS-REFERENCE TO RELATED APPLICATIONS

This application is based upon and claims the benefit of priority of the prior Japanese Patent Application No. 2009-34293, filed on Feb. 17, 2009, the entire contents of which are incorporated herein by reference.

FIELD

The embodiment discussed herein is related to a copy control apparatus for controlling the copy process between the disks of a RAID (Redundant Arrays of Inexpensive (or Independent) Disks) system.

BACKGROUND

In the related art, a large amount of data is stored in a RAID system having a plurality of disks. The RAID system further includes a cache for storing the data provisionally, and is utilized for various processes.

The RAID system uses the cache, for example, in the case where the copy process is executed to protect the data written in a disk. The RAID system uses the cache also to accept a data write request from a host computer. Referenced documents are Japanese Laid-Open Patent Publication No. 2004-102815 and 2003-345524.

The conventional RAID system poses the problem that the copying speed is reduced.

SUMMARY

According to an aspect of the invention, a copy control apparatus for controlling a copy process between disks includes a copy process execution unit, a data capacity measuring unit, and a changing unit. The copy process execution unit executes the copy process between disks by securing a storage area on a cache. The data capacity measuring unit measures a data capacity contained in a write request accepted from a host system during execution of the copy process between disks by the copy process execution unit. The changing unit changes a capacity of the storage area secured by the copy process execution unit in accordance with the data capacity measured by the data capacity measuring unit.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 2 is a diagram for explaining an outline of the RAID system;

DESCRIPTION OF EMBODIMENTS

A RAID system will be described below in detail as an embodiment of a copy control apparatus with reference to the accompanying drawings.

[Outline of RAID System]

Figure 1A:
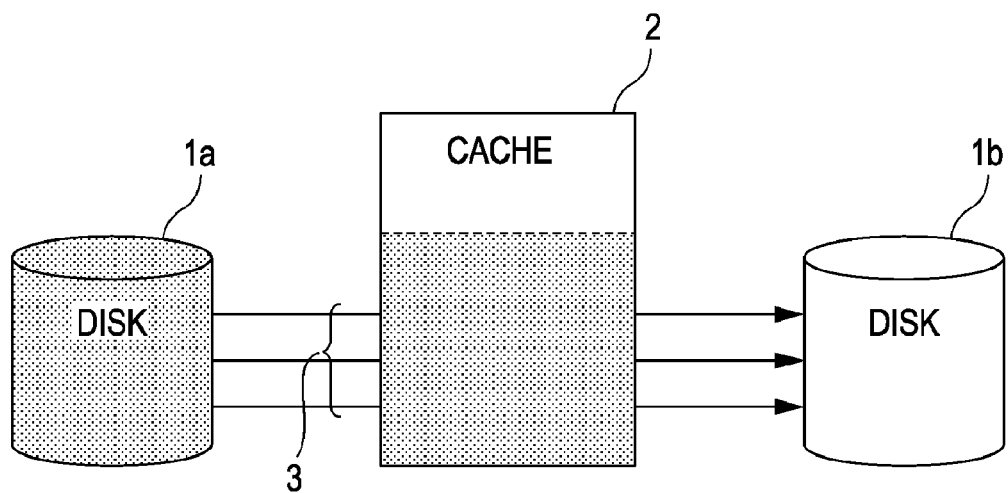
FIGS. 1A and 1B are diagrams for explaining an outline of a RAID system according to an embodiment.
Figure 1B:
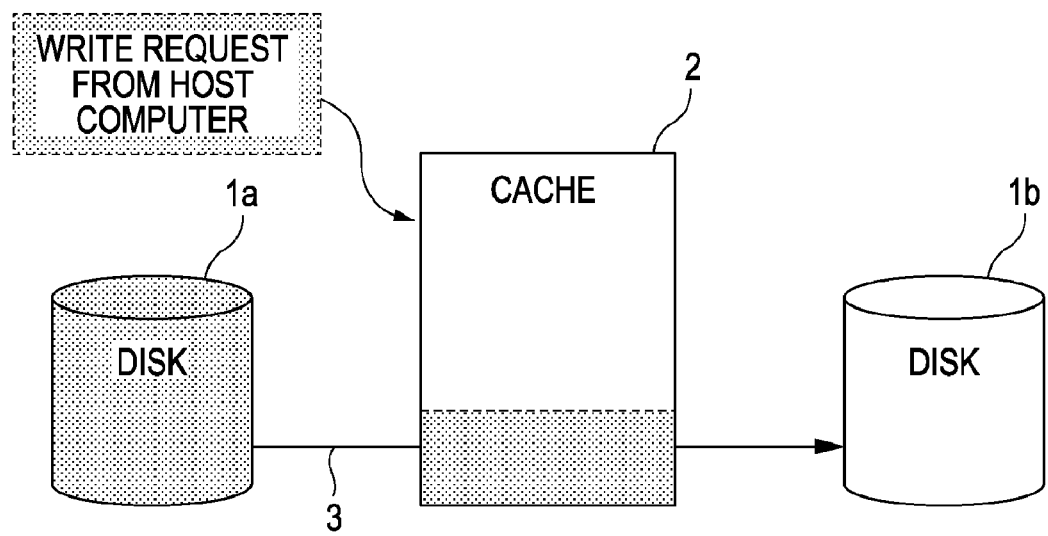

FIGS. 1A, 1B, and 2 are diagrams for explaining an outline of the RAID system according to an embodiment. An aspect of the RAID system according to this embodiment lies in that when the copy process between disks 1a and 1b and the data write process is executed at the same time, the same cache 2 is used. The RAID system reduces if not prevents a slowdown of the copying speed which otherwise might be caused by a cache busy state in which the storage area on the cache for storing the data included in the write request runs short.

Specifically, in the RAID system according to this embodiment, as illustrated in FIG. 1A, a plurality of sessions 3 are established at substantially the same time between the disks 1a and 1b, and the storage area of a capacity corresponding to the number of the sessions 3 thus established is secured on the cache 2. The RAID system executes the copy process between the disks 1a and 1b using the storage area thus secured. A "session" is defined as information for associating a disk containing the data of a copy source to a disk for storing the copied data.

The RAID system, upon acceptance of a data write request from a host computer, measures the capacity of the data contained in the write request. As the result of the measurement, the RAID system judges that the data contained in the write request may not be stored in the storage area with the capacity currently available on the cache.

In the process, the RAID system, as illustrated in FIG. 1B, changes the number of the sessions 3 established between the disks 1a and 1b to one. Thus, by reducing the capacity of the storage area used for the copy process, the RAID system makes it possible to store the data contained in the write request on the cache 2.

As described above, in the RAID system according to this embodiment, the capacity of the storage area on the cache for storing the data is increased in accordance with the capacity of the data contained in the write request, and therefore, the occurrence of the cache busy state is reduced or prevented, with the result that the slowdown of the copying speed is reduced or prevented.

If the RAID system accepts a data write request from the host computer during the execution of the copy process, the storage area on the cache for storing the data contained in the write request may run short, and what is called a cache busy state may develop. In such a case, the RAID system according to the comparative example suspends the copy process until the cache busy state is obviated. As a result, the RAID system according to the comparative example causes a delay in the copy process, thereby causing the problem of a reduced copying speed.

Specifically, in the RAID system according to the comparative example, as illustrated in FIG. 2, once the cache busy state is generated, the entire copy process is suspended until the cache busy state is obviated in spite of the presence of the copy process to be executed. In the RAID system according to this embodiment, in contrast, as illustrated in FIG. 2, the copy process is continued in one session even during the period when the RAID system according to the comparative example is in the cache busy state.

By the time when the cache busy state of the RAID system according to the comparative example is obviated, therefore, the data remaining to be processed in the RAID system according to this embodiment is reduced by the amount processed with one session. As compared with the RAID system according to the comparative example, therefore, the whole copy process may be finished earlier. As a result, the RAID system according to the embodiment may prevent the slowdown of the copying speed.

[Configuration of RAID System]

Figure 3:
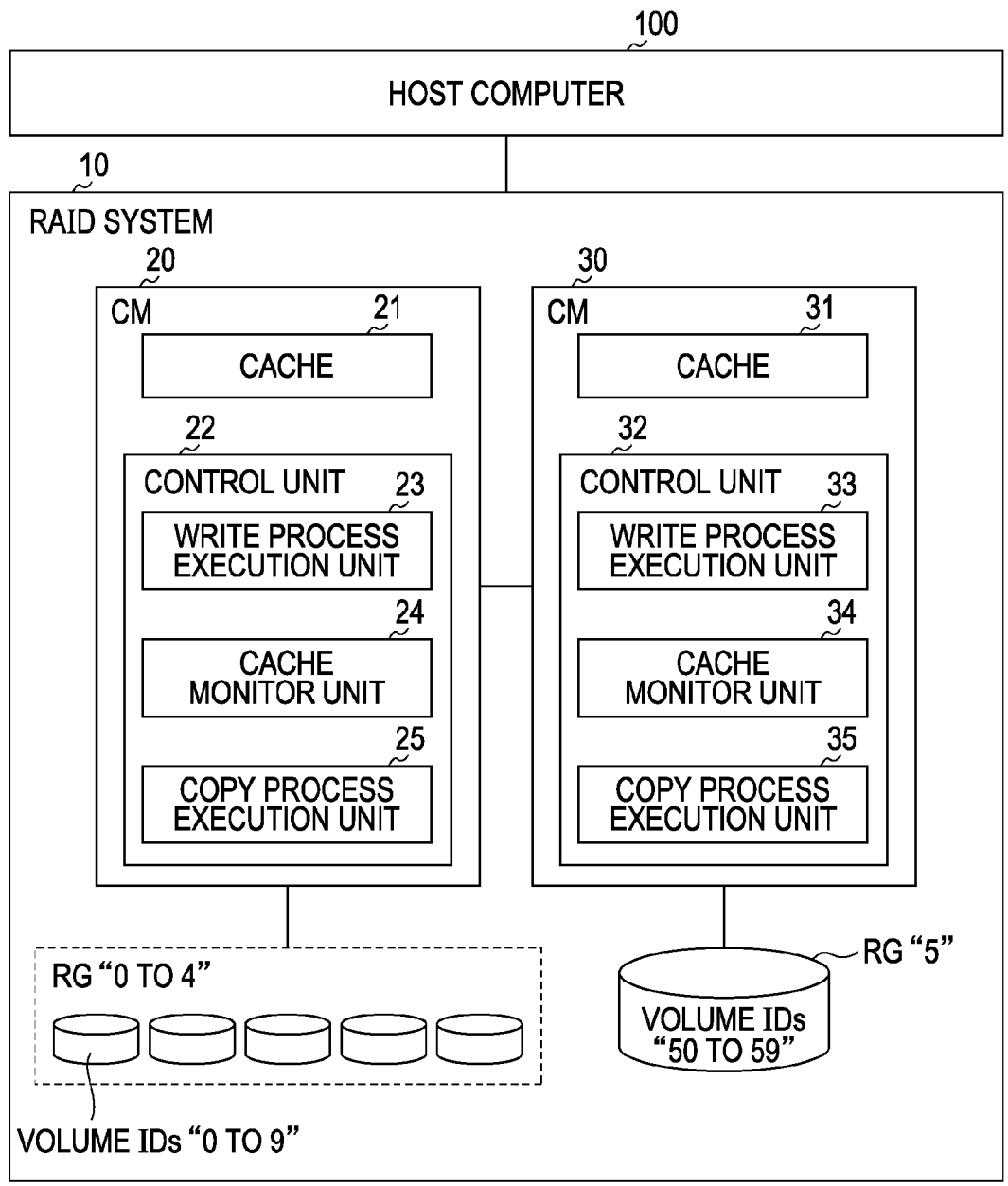
FIG. 3 is a block diagram illustrating the configuration of the RAID system.

FIG. 3 is a block diagram illustrating the configuration of the RAID system. As illustrated in FIG. 3, a RAID system 10 is connected to a host computer 100 in a communicable state. In this case, the host computer 100 is a device that gives a write request for writing data in a disk or a read request for reading data from a disk to the RAID system 10.

Also, the RAID system 10 includes RAID groups (RG) 0 to 5. The RG is an assemblage of recording media to record the data. The RG 0, for example, is a logical disk including one or a plurality of physical disks, in which the storage area on the disk is divided into, for example, ten volumes and the data is stored in each volume. Also, the RG 5, on the other hand, is a large capacity disk in which the storage area on the disk is divided into, for example, 50 volumes in each of which the data is recorded. Each volume is assigned a volume ID (volume identifier) to uniquely identify the particular volume.

The RAID system 10 further includes CM (centralized modules) 20 and 30 having substantially the same configuration. A part of the configuration of the CM 20 and the CM 30 will be explained below.

The CM 20 includes a cache 21 and a control unit 22. The cache 21 provisionally stores the data contained in the write request accepted from the host computer 100. The cache 21 also provisionally stores the copied data.

The control unit 22 includes a write process execution unit 23, a cache monitor unit 24, and a copy process execution unit 25.

In the write process execution unit 23, upon acceptance of a data write request from the host computer 100, the data contained in the write request is stored in a storage area on the cache 21 other than the storage area secured by the copy process. Similarly, a write process execution unit 33 of the CM 30 stores the data included in the write request accepted from the host computer 100 in a cache 31.

When the write process execution unit 33 of the CM 30 accepts the data write request from the host computer 100 during the execution of the copy process, the cache monitor unit 24 measures the capacity of the data contained in the write request.

Specifically, the cache monitor unit 24 measures the capacity of the data contained in the write request accepted from the host computer 100, and monitors the amount of the data accumulated in the cache 31. Once the data accumulation value indicating the amount of the data accumulated in the cache 31 exceeds a predetermined threshold value, the cache monitor unit 24 requests the copy process execution unit 25 to change the number of sessions. Also, when the data accumulation value of the cache 31 is reduced to a predetermined threshold value or below, on the other hand, the cache monitor unit 24 requests the copy process execution unit 25 to restore the number of sessions.

The copy process execution unit 25 secures a part of the storage area on the cache 31, and executes the copy process between the disks using the storage area thus secured. Also, the copy process execution unit 25 changes the capacity of the storage area secured for the copy process, in accordance with the capacity of the data contained in the write request measured by the cache monitor unit 24.

(Example of Process by Copy Process Execution Unit)

The process executed by the copy process execution unit 25 and the copy process execution unit 35 will be explained taking, as an example, a situation in which the data in the volume IDs 0 to 9 of the RG 0 are copied and the copied data is stored in the volume IDs 50 to 59 of the RG 5.

The copy process execution unit 25, based on a command accepted from a user, generates a total of ten-session volume including one volume ID (for example, ID 0) as a copy source and one volume ID (for example, volume ID 50) as a copy destination. The number of the session information items generated may be set in advance by a user.

Next, the copy process execution unit 25 sets the generated session information items in the copy process execution unit 35 of the CM 30. Then, the copy process execution unit 25 secures the storage area of a capacity equivalent to ten session information items on the cache 31 of the CM 30. The copy process execution unit 25 copies the data on the volume IDs 0 to 9 of the RG 0 at substantially the same time, and stores the copied data in the storage area on the cache 31.

Once the session information items including the volume IDs 50 to 59 are set as a copy destination by the copy process execution unit 25, the copy process execution unit 35 reads the data stored in the cache 31, and stores the data in each volume corresponding to the volume IDs 50 to 59 as the copy destination.

Assume that, as a result of the write process execution unit 33 of the CM 30 accepting a write request from the host computer 100 and storing the data included in the write request in cache 31, a data accumulation value of the cache 31 exceeds a predetermined threshold value. Then, the copy process execution unit 25 accepts a request from the cache monitor unit 24 to change the number of sessions, and cancels the session information items set in the copy process execution unit 35. Next, the copy process execution unit 25 generates one session information item and resets the session information items in the copy process execution unit 35. Then, the copy process execution unit 25 newly secures the storage area of a capacity equivalent to one session information item on the cache 31, and stores the copied data in the storage area newly secured on the cache 31.

Now, the copy process execution unit 35 may reestablish one session with a high or the highest copying speed of all the sessions established between the disks at the same time, and by changing the capacity of the storage area on the cache 31 secured for the copy process, may increase the copying speed to the highest copying speed of one session during the period of the copy process execution. Assuming, for example, that there is a plurality of RGs among which the copied data is stored and that the disk rotational speed varies from one RG to another, the copy process execution unit 35, upon acceptance of a request from the cache monitor unit 24 to change the number of sessions, specifies the RG with the highest disk rotational speed. Then, the copy process execution unit 35 resets the session information items including one volume ID of the volume associated with the specified RG.

Assuming that the copied data is stored in the disk through a plurality of types of interfaces (such as Fiber Channel, SATA (Serial Advanced Technology Attachment), SAS (Serial Attached SCSI), etc.), the copy process execution unit 35, upon acceptance of a request from the cache monitor unit 24 to change the number of sessions, specifies an interface with the highest data transfer rate. Then, the copy process execution unit 35 resets the session information items of the session passing through the specified interface. By doing so, the highest copying speed may be secured during the period in which the copy process is executed in one session.

Also, when the copy source data is located among a plurality of RGs, the session information items including one volume ID of the volume associated with the RG having the most data of the copy source may be reset. By doing so, the copy process of the RG having the largest load may be executed in priority. Also, as long as the environment of the RG (for example, the disk rotational speed, the number of volumes storing the data, etc.) where the copied data is stored remains the same, the session information items may be reset in the order the volumes are configured.

When one session information item is reset by the copy process execution unit 25, the copy process execution unit 35, after actual completion of reading the data stored in the cache 31 by the copy process execution unit 25, reads the data based on the session information item thus reset.

After that, assuming that the write process of the data included in the write request is completed and the data accumulation value of the cache 31 is reduced to a predetermined threshold value or below, the copy process execution unit 25 accepts the request from the cache monitor unit 24 to restore the number of sessions, and cancels the session information items reset in the copy process execution unit 35. The copy process execution unit 25 sets the initially-set ten session information items again in the copy process execution unit 35, and by copying the data in the volume IDs 9 to 0 of the RG 0 at the same time, resumes the process of storing the copied data in the cache 31.

At the time of canceling the session information items set in the copy process execution unit 35, the particular session information items may retained on the cache or provisionally saved in the disk to facilitate the resetting of the session information items. Then, by resetting the session information items retained on the cache or saved in the disk, the copy process may be restarted from the data continued from the previous session.

Also, when the initially-set session information items are set again by the copy process execution unit 25, the process is restarted in which the copy process execution unit 35 reads the data stored in the cache 31 by the copy process execution unit 25 and the data is stored in each volume corresponding to the volume IDs 50 to 59 as a copy destination.

[Process by RAID System]

Figure 4:
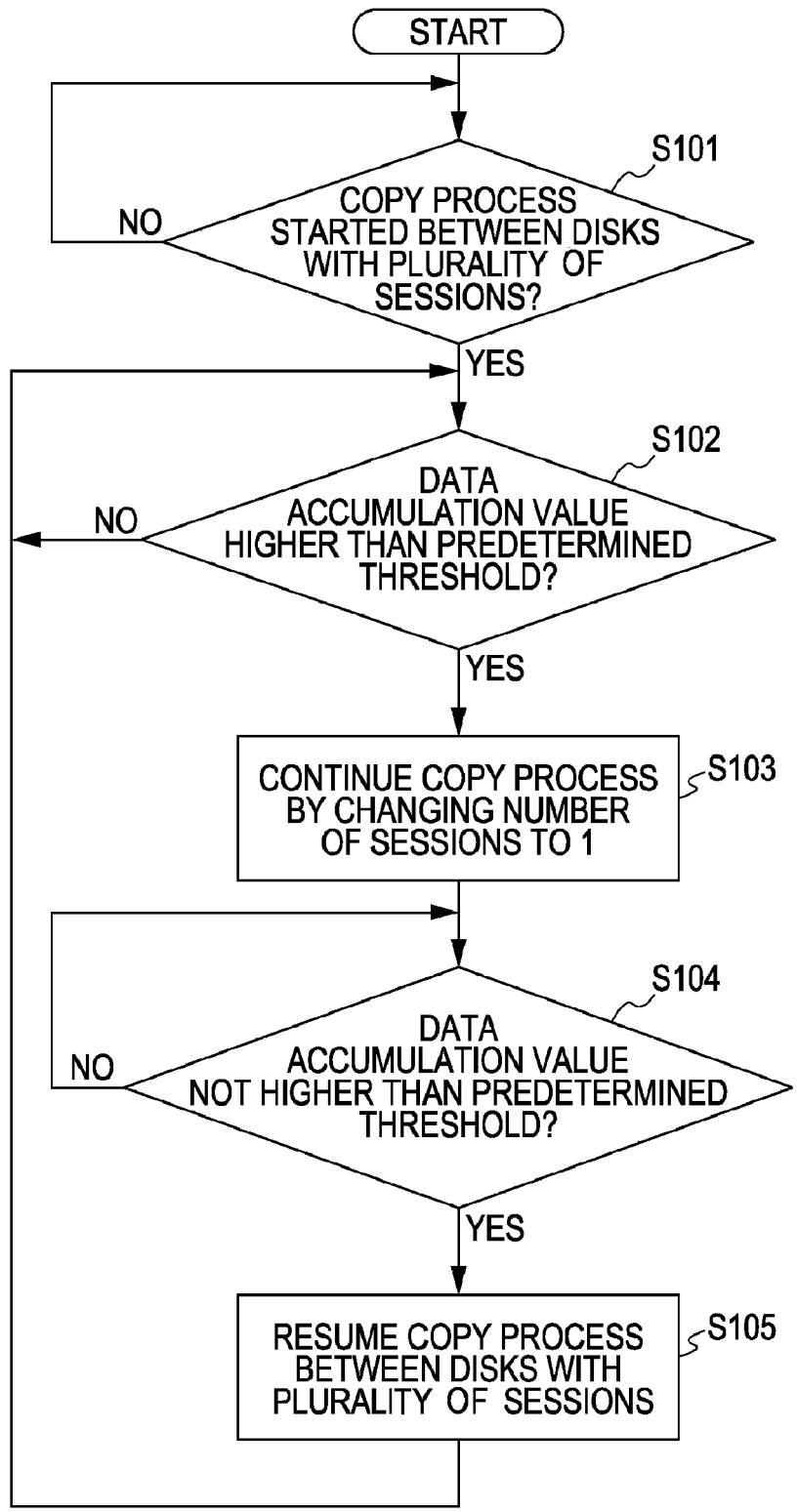
FIG. 4 is a flowchart illustrating the process flow in the RAID system.
Figure 5:
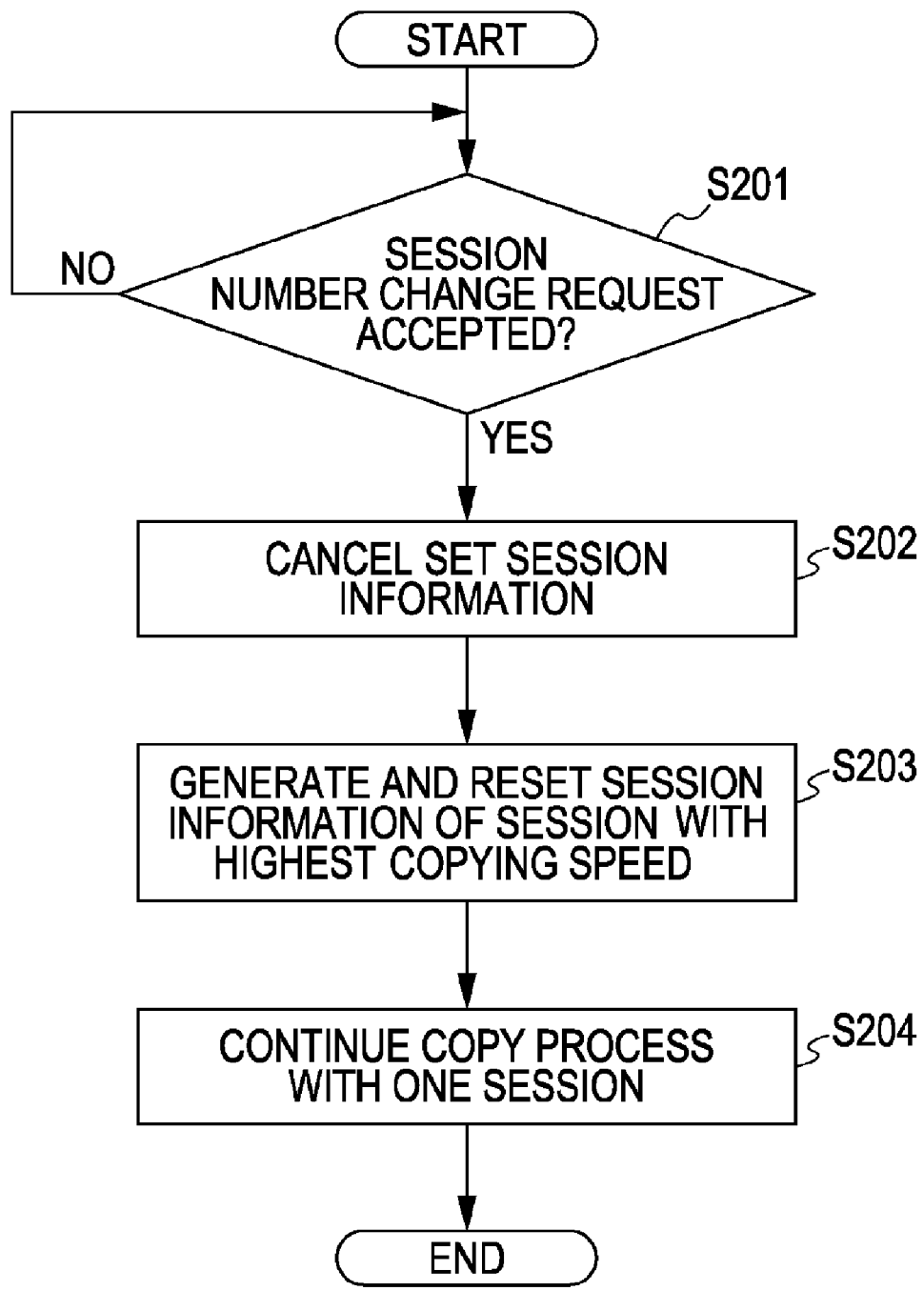
FIG. 5 is a flowchart illustrating the process flow in the RAID system.
Figure 6:
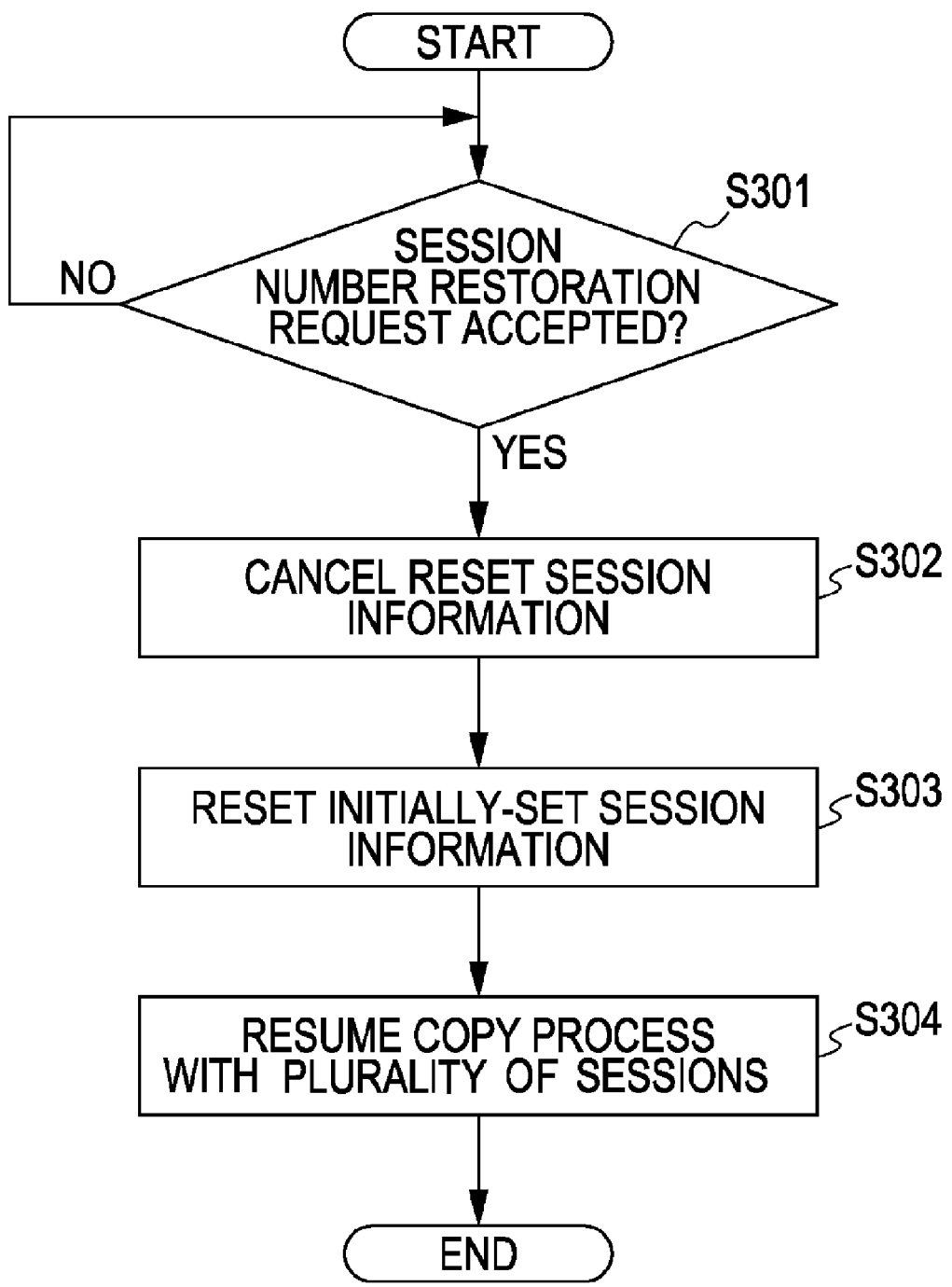
FIG. 6 is a flowchart illustrating the process flow in the RAID system.

FIGS. 4 to 6 are flowcharts illustrating the flow of the process executed by the RAID system. The RAID system 10 ends the process described below upon completion of the copy process between the disks. As illustrated in FIG. 4, the copy process execution unit 25 starts the copy process between the disks with the sessions in the number set by the user in advance (operation S101). When starting the copy process with a plurality of sessions (YES in operation S101), the cache monitor unit 24 monitors the amount of the data accumulated in the cache 31 (operation S102).

Now, when the data accumulation value of the cache 31 exceeds a predetermined threshold value (YES in operation S102) as the result of accepting the write request from the host computer 100, the copy process execution unit 25 changes the number of sessions to 1 and continues the copy process (operation S103).

Specifically, as illustrated in FIG. 5, upon acceptance of a request from the cache monitor unit 24 to change the number of sessions (YES in operation S201), the copy process execution unit 25 cancels the session information items set in the copy process execution unit 35 (operation S202). The copy process execution unit 25 generates one session information item of the session with the highest copying speed among the canceled sessions, and resets the session information item in the copy process execution unit 35 (operation S203). The copy process execution unit 25 newly secures the storage area of a capacity equivalent to one session information item on the cache 31, and continues the copy process with one session (operation S204).

Returning the explanation to FIG. 4, when the data accumulation value of the cache 31 is reduced to a predetermined threshold value or below as the result of completing the process of writing the data contained in the write request (operation S104), the copy process execution unit 25 resumes the copy operation with a plurality of sessions (operation S105).

Specifically, as illustrated in FIG. 6, upon acceptance of a request from the cache monitor unit 24 to restore the number of sessions (YES in operation S301), the copy process execution unit 25 cancels the session information items reset in the copy process execution unit 35 (operation S302). Then, the copy process execution unit 25 sets the initially-set session information items again in the copy process execution unit 35 (operation S303). The copy process execution unit 25 secures again the storage area of a capacity equivalent to a plurality of sessions on the cache 31, and resumes the copy process for the remaining data with a plurality of sessions (operation S304).

As described above, according to this embodiment, in accordance with the capacity of the data contained in the write request, the capacity of the storage area on the cache is increased to store the particular data. Thus, the occurrence of the cache busy state is reduced if not prevented with the result that the reduction in the copying speed is also reduced or prevented. According to this embodiment, for example, even when the copy process might be suspended by the RAID system of the comparative example, the copy process may be continued with a reduced number of sessions. As compared with the RAID system according to the comparative example, therefore, the copy process may be executed within a short time.

The RAID system 10 according to another embodiment will be explained below.

The function of each component element of the RAID system 10 illustrated in FIG. 2 is conceptual, and the RAID system 10 is not necessarily configured physically as illustrated. The specific form of distribution or integration of the RAID system 10 is not necessarily limited to that illustrated in the drawing, and the function of the write process execution unit 23 may be integrated with the function of the cache monitor unit 24. In this way, the whole or a part of the RAID system 10 may be functionally or physically distributed or integrated in an arbitrary unit in accordance with the various loads and the operating conditions.

Further, the whole or an arbitrary part of each processing function (FIG. 4, for example) executed by the RAID system 10 may be realized according to a program analyzed and executed by a CPU or a MPU or as hardware in wired logic.

Although the embodiment described above represents a case in which the number of sessions is changed to 1, the embodiment described above is not limited to this case, and the number of sessions may be changed to any number of sessions in which the data contained in the write request may be stored in the storage area on the cache.

With the copy control apparatus disclosed above, the reduction in the copying speed which otherwise might be caused by the occurrence of the cache busy state may be reduced if not prevented.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A copy control apparatus for controlling a copy process between disks, the apparatus comprising:
   a copy process execution unit that executes the copy process between disks by securing a storage area on a cache;
   a data capacity measuring unit that measures a data capacity contained in a write request accepted from a host system during execution of the copy process between disks by the copy process execution unit; and
   a changing unit that changes a capacity of the storage area secured by the copy process execution unit in accordance with the data capacity measured by the data capacity measuring unit,
   wherein the copy process execution unit secures, on the cache, a storage area capacity corresponding to a number of sessions established between the disks in the same time period, and executes the copy process between disks using the secured storage area, and the changing unit, upon judgment that a data accumulation value indicating an amount of data accumulated in the cache is not less than a predetermined threshold value based on a result of measuring the data capacity by the data capacity measuring unit, changes the number of the currently established sessions to one and changes the capacity of the storage area secured by the copy process execution unit.

2. The copy control apparatus according to claim 1, wherein, among the sessions established in the same time period between the disks, the changing unit reestablishes a session that has the highest copying speed, and changes the capacity of the storage area secured by the copy process execution unit.

3. The copy control apparatus according to claim 1, wherein, among disks having the data of the copy source, the changing unit reestablishes a session between the disk having the most data of the copy source and a disk for storing copied data, and changes the storage area capacity secured by the copy process execution unit.

4. A method of controlling a copy control apparatus for controlling a copy process between disks, said method comprising:
   securing a storage area on a cache by the copy control apparatus;
   executing the copy process between the disks using the storage area secured;
   measuring a data capacity contained in a write request accepted from a host system during execution of the copy process between the disks;
   changing a capacity of the storage area secured by said securing based on the data capacity measured by said measuring;
   securing, on the cache, a storage area capacity corresponding to a number of sessions established between the disks in a same time period;
   determining a data accumulation value indicating an amount of data accumulated in the cache as a result of measuring the data capacity by the measuring; and
   changing, when the data accumulation value is not less than a predetermined threshold value, the number of currently established sessions to one and the capacity of the storage area secured.

* * * * *